US009551922B1

(12) United States Patent
Liu et al.

(10) Patent No.: US 9,551,922 B1
(45) Date of Patent: Jan. 24, 2017

(54) FOREGROUND ANALYSIS ON PARAMETRIC BACKGROUND SURFACES

(75) Inventors: Qiang Liu, Cupertino, CA (US); Ning Yao, Cupertino, CA (US); Sowmya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 622 days.

(21) Appl. No.: 13/543,522

(22) Filed: Jul. 6, 2012

(51) Int. Cl.
*G06F 3/042* (2006.01)
*G03B 35/00* (2006.01)
*G06T 7/00* (2006.01)

(52) U.S. Cl.
CPC ............ *G03B 35/00* (2013.01); *G06T 7/0051* (2013.01)

(58) Field of Classification Search
CPC ............ G06T 2207/10012; G06T 2207/30196; G06T 7/0051; G06T 2207/10021; G03B 35/00; G02B 21/22; G02B 2027/0134; G06K 9/00221; G06K 9/3241
USPC .......................... 345/173–178, 419; 382/103; 178/18.01–18.09
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2006/0139314 | A1* | 6/2006 | Bell .............................. 345/156 |
| 2012/0223885 | A1 | 9/2012 | Perez |
| 2012/0293402 | A1* | 11/2012 | Harrison et al. .............. 345/156 |
| 2012/0326995 | A1* | 12/2012 | Zhang et al. .................. 345/173 |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Amare Mengistu
*Assistant Examiner* — Stacy Khoo
(74) *Attorney, Agent, or Firm* — Lee & Hayes, PLLC

(57) ABSTRACT

Techniques are described for projecting content onto a display surface and for analyzing the hand of a user that is placed over the display surface, such as when the user is making a command gesture. Based on the location and known shape of the display surface, a surface depth map is calculated corresponding to the display surface. Points of the calculated surface depth map are then subtracted from respective points an observed depth map to produce a foreground depth map corresponding to the user hand. The hand may be further characterized and tracked based on the foreground depth map.

25 Claims, 3 Drawing Sheets

FOREGROUND ANALYSIS ON PARAMETRIC BACKGROUND SURFACES

BACKGROUND

A large and growing population of people is enjoying entertainment through consumption of digital content items, such as music, movies, images, books and so on. Many people today consume digital content through a wide variety of electronic devices. Among these electronic devices are cellular telephones, personal digital assistants (PDAs), electronic book readers, portable media players, tablets, netbooks and the like. Devices such as this traditionally rely on input mechanisms such as keyboards, which require physical manipulation by a user. Increasingly, however, it is desired to detect and monitor the physical positions and movements of users and objects within an environment, and to respond to gestures and other actions of a user without dedicated physical input devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques for presenting content to a user while detecting the position and shape of a user's hand over a target surface upon which the content is presented. As an example, visual content may be projected onto a passive display medium held by a user. A user may touch the surface of the display medium and/or perform hand gestures over the display medium in order to provide commands. The systems and techniques described herein produce a depth map corresponding to a foreground object such as a hand, allowing the hand to be characterized and tracked in order to detect gestures.

For example, the described systems and techniques may allow the user to read an electronic book, watch a video, view images, or otherwise consume any other form of projected content on the display medium. The user may be able to control the presentation of the content by appropriate hand gestures. For example, the user may turn pages of a displayed book by swiping a finger across the display medium.

In order to detect hand gestures, an environment is observed and imaged to create an observed depth map of at least the portion of the scene containing the display medium, which may at times be partially occluded by the hand of the user. In addition, a calculated surface depth map of the display medium is created based on a known or previously detected position of the display medium and a known shape or parametric description of the display medium.

A foreground depth map is then produced, based at least on part on differences between the observed depth map and the calculated depth map of the display medium. This isolates the user hand, and indicates relative depths of the points of the user's hand that are visible in the observed depth map. Further analysis may then be performed with respect to the foreground depth map in order to characterize the position and shape of the hand. The analysis may be repeated over time to track movements or gestures of the hand.

Example Environment

Figure 1:
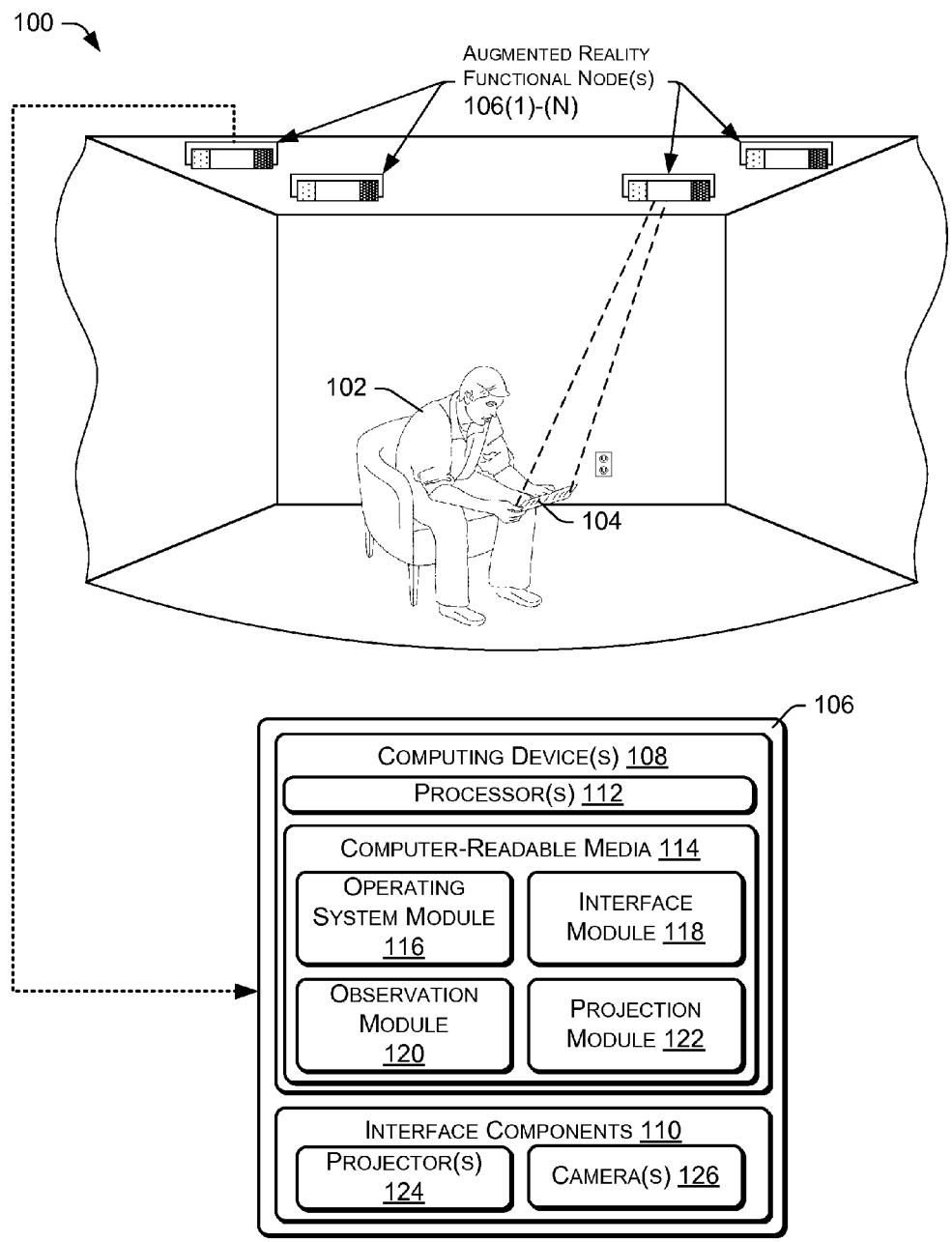
FIG. 1 illustrates an environment that includes an augmented reality functional node (ARFN) that projects content onto a display surface and that detects a foreground object such as a hand relative to the display surface.

FIG. 1 illustrates an example environment 100 in which a user 102 consumes content that is projected onto a passive or non-powered handheld display surface or medium 104 by one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices.

The projected content may include any sort of multimedia content, such as text, color images or videos or any other visual content. In some cases, the projected content may include interactive content such as menus and controls.

Each ARFN 106 may include one or more computing devices 108, as well as one or more interface components 110. The computing devices 108 and interface components 110 may be configured in conjunction with each other to interact with the user 102 within the environment 100. In particular, the ARFN 106 may be configured to project content onto the display medium 104 for viewing by the user 102, and to accept commands from the user 102 in the form of hand gestures or other actions.

The computing device 108 of the example ARFN 106 may include one or more processors 112 and computer-readable media 114. The processor(s) 112 may be configured to execute instructions, which may be stored in the computer-readable media 114 or in other computer-readable media accessible to the processor(s) 112. The processor(s) 112 may include digital signal processors (DSPs), which may be used to process audio signals and/or video signals.

The computer-readable media 114, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 108. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth, which are configured to execute on the processor(s) 112. For instance, the computer-readable media 114 may store an operating system module 116 and an interface module 118. The operating system module 116 may be configured to manage hardware and services within and coupled to the computing device 108 for the benefit of other modules. The interface module 118 may be configured to receive and interpret commands received from users within the environment 100, and to respond to such commands in various ways as determined by the particular environment.

The computer-readable media 114 may also include an observation module 120 that is executable to perform certain processing as described below. In particular, the observation module 120 may implement the techniques described below for analyzing an environment to determine the location of the display medium 104 and for creating a depth map corresponding to the hand of a user over the display medium 104.

The computer-readable media 114 may further include a content projection module that is executable to project content onto the display medium 104. The projection module 122 may receive the position of the display medium 104, and may manipulate the projected content so that it appears correctly on the display medium 104. For example, the projection module 122 may vary the size, location, orientation and aspect ratio of a projected image.

The computer-readable media 114 may contain other modules, which may be configured to implement various different functionality of the ARFN 106.

The ARFN 106 may include various interface components 110, such as user interface components and other components that may be used to detect and evaluate conditions and events within the environment 100. As examples, the interface components 110 may include one or more projectors 124 and one or more cameras 126. The interface components 110 may in certain implementations include various other types of sensors and transducers, content generation devices, and so forth, including microphones, speakers, range sensors, three-dimensional mapping sensors, and other devices.

The projector(s) 124 may be used to project content onto the display medium 104 for viewing by the user 102. In addition, the projector(s) 124 may project patterns, such as non-visible infrared patterns, that can be detected by the camera(s) 126 and used for 3D reconstruction and modeling of the environment 100. The projector 124 may comprise a microlaser projector, a digital light projector (DLP), cathode ray tube (CRT) projector, liquid crystal display (LCD) projector, light emitting diode (LED) projector or the like. The projector may have rotate, pan, and zoom capabilities, implemented electronically or mechanically.

The camera(s) 126 may be used for various purposes, such as determining the location of the user 102, detecting user gestures, determining the location of the display medium 104 and objects within the environment 100, reconstructing 3D characteristics of objects within the environment 100, and so forth. Various forms of structured light analysis may be used in conjunction with the camera(s) 126 to reconstruct three-dimensional properties of the environment 100. Other types of image sensors may also be used for this purpose, such as range finders, depth sensors, and devices that analyze optical or audio time-of-flight observations.

The coupling between the computing device 108 and the interface components 110 may be via wire, fiber optic cable, wireless connection, or the like. Furthermore, while FIG. 1 illustrates the computing device 108 as residing within a housing of the ARFN 106, some or all of the components of the computing device 108 may reside at another location that is operatively connected to the ARFN 106. In still other instances, certain components, logic, and/or the like of the computing device 108 may reside within a projector or camera. Therefore, it is to be appreciated that the illustration of the ARFN 106 of FIG. 1 is for illustrative purposes only, and that components of the ARFN 106 may be configured in any other combination and at any other location.

Furthermore, additional resources external to the ARFN 106 may be accessed, such as resources in another ARFN 106 accessible via a local area network, cloud resources accessible via a wide area network connection, or a combination thereof. In still other instances, the ARFN 106 may couple to and control other devices within the environment, such as televisions, stereo systems, lights, and the like.

In operation, the user 102 holds the passive display medium 104. In response, the ARFN 106 recognizes and detects the location and orientation of the display medium 104, and begins projecting content onto the display medium 104. The user 102 is then able to observe or consume the projected content as well as navigate to other content by performing hand gestures over the display medium 104.

The ARFN 106 may also track the location and orientation (pose) of the display medium 104 and continue to project an image onto the display medium 104 at different locations within the environment 100 as the display medium 104 moves. Thus, the user 102 is able to move about within the environment and continue to consume the projected content. The ARFN 106 may distort or otherwise manipulate the projected image to account for different orientations, sizes and shapes of the display medium 104, as well as for varying distances between the ARFN 106 and the display medium 104.

The observation module 120 is configured to repeatedly and continuously detect the three-dimensional pose of the display medium 104, and to pass this information to the projection module 122. In response, the projection module directs the projected image onto the display medium 104 at the detected location, and adjusts the projected image to account for size and pose of the display medium relative to the projector 124. The observation module 120 may continue to track the pose of the display medium 104 as the user 102 and the display medium 104 move, and may continue to pass motion information along to the projection module 122. By doing so, the projection module 122 is able to correctly project the content onto the display medium 104 even as the pose of the display medium 104 changes.

Figure 2:
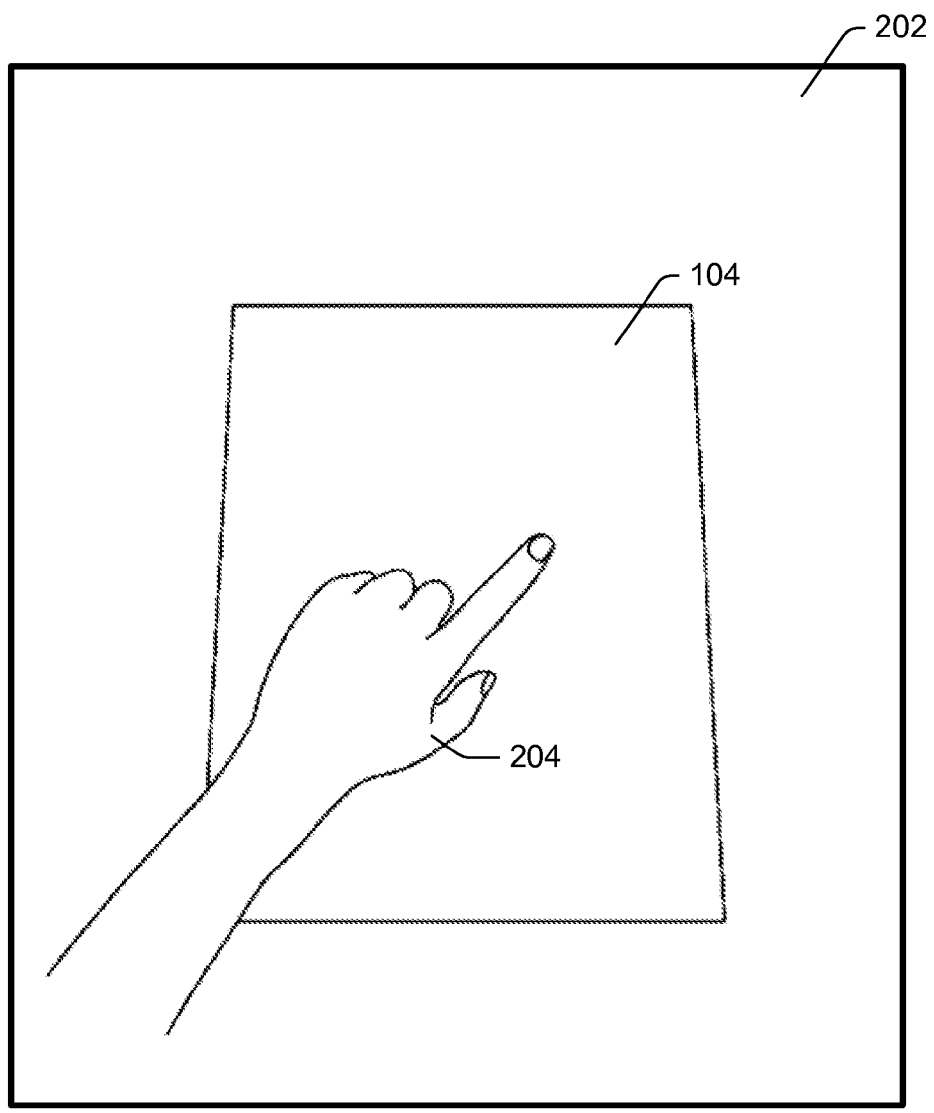
FIG. 2 is a top view of a scene that may be observed by the ARFN to detect user hand gestures.

FIG. 2 shows an example of an observed portion an environment 202 containing the display medium 104. A user's hand 204 is positioned over the display medium 104, in the process of making a gesture. The gesture may comprise touching the display medium, making a particular hand shape, moving the hand in a particular path or to a particular location relative to the display medium, shaping the hand in a particular sequence, or any combination of these and other hand manipulations and/or positions. Note that the described techniques may also be used to detect other foreground objects over a target object, medium, or surface.

Although the display medium 104 may have any desired size and shape, in the embodiment described herein the display medium 104 is a rectangle or other polygon. The display medium 104, as an example, may comprise a 3 by 5 inch card or an 8.5 by 11 inch sheet of plain white paper. Alternatively, the display medium 104 may be any object having a surface upon which images can be projected. The display medium 104 may also be curved, irregular or non-planar in some embodiments.

In certain embodiments, the display medium 140 has a display surface with a known or predefined shape. In certain embodiments, the shape of the display surface may be described parametrically, such as by a known parametric expression or equation. As an example, a rectangular surface may be defined parametrically in terms of the locations of its corners. Other types of surfaces, such as spherical surfaces, circular surfaces, and so forth may be parametrically defined or described by other characteristics, reference points, or dimensions. The size of the display surface of the display medium 104 may be initially unknown.

Example Operation

Figure 3:
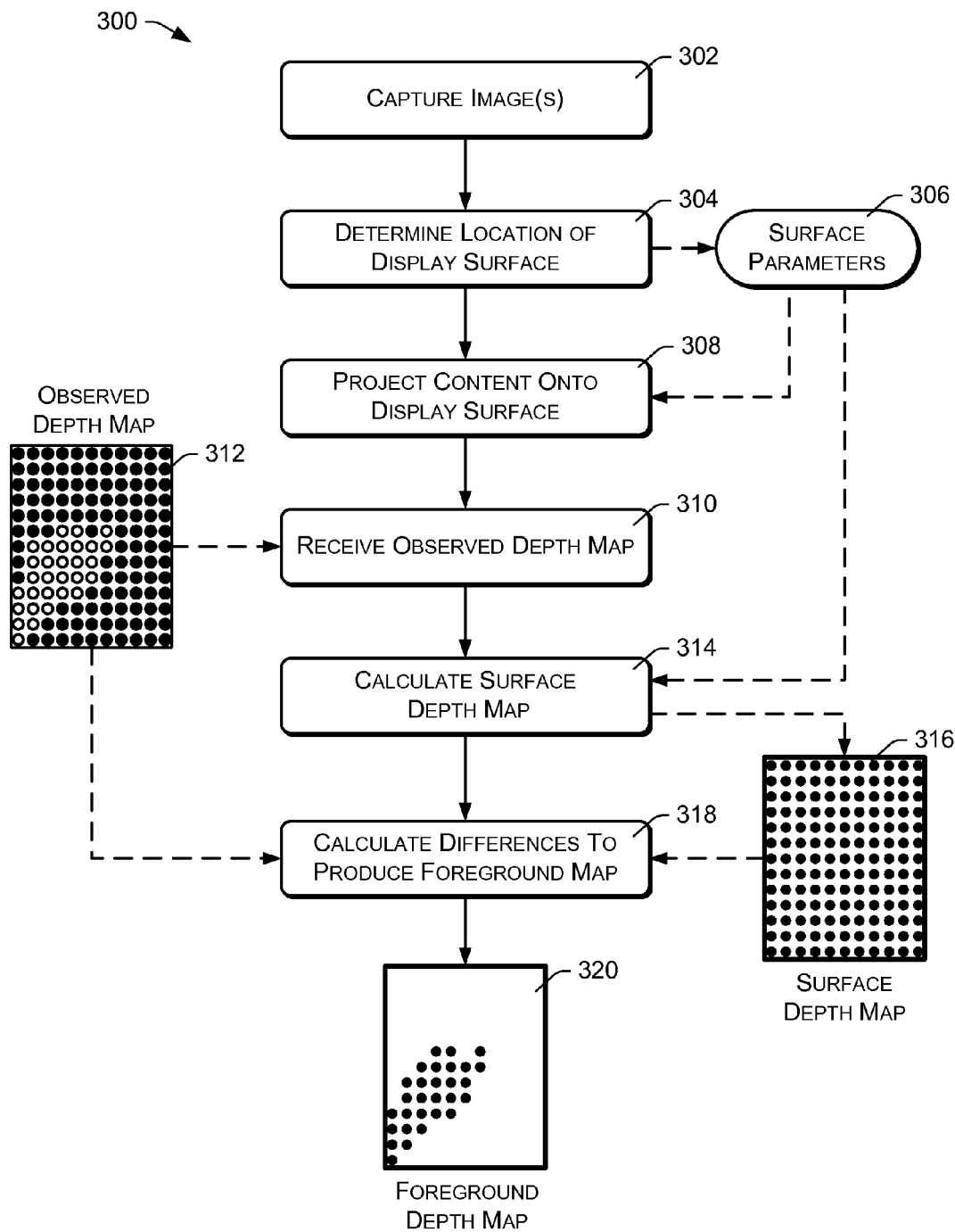
FIG. 3 is an example flow diagram of an ARFN projecting content onto a display surface and producing a depth map corresponding a foreground object such as a hand that is placed over the display surface.

FIG. 3 illustrates an example method 300 of projecting content onto a display surface and producing a depth map or three-dimensional image corresponding to a hand of a user that is positioned over the display surface. The display surface may in some cases be moveable. For example, the display area may comprise or be formed by a handheld object or medium, such as a blank sheet, upon which the content is to be displayed.

An action 302 comprises capturing or receiving one or more images of a scene that includes the target display medium or surface. The action 302 may be performed by the camera(s) 126 of the ARFN 106 or by other sensing equipment such as 3D sensors, range finders, proximity sensors, and so forth. The images may comprise 2D optical images and/or 3D depth images such as depth maps.

An action 304 comprises determining the pose or position of the display surface within the scene, by analyzing the one or more images captured in the action 302. The action 304 may also comprise determining the size of the display surface.

Locating the display medium or surface within the environment may be performed in various ways. For example, a 2D optical image of the environment may be analyzed to detect areas of the environment having the known color of the display surface, and these areas may be further analyzed to detect features of the display surface such as edges, corners, visible marks, and/or other characteristics. The location of the display surface may be based on or derived from such identified features. As a more specific example, methods for determining and tracking the 3D pose of a display surface are described in the following United States Patent Applications, which are hereby incorporated by reference:

"Edge-Based Pose Detection", Ser. No. 13/486,634, filed Jun. 1, 2012;

"Pose Detection", Ser. No. 13/455,949, filed Apr. 25, 2012; and

"Pose Tracking", Ser. No. 13/486,664, filed Jun. 1, 2012.

Using the methods described therein, the position or 3D pose of a moveable display surface may be determined and specified in terms of corners or other features of the display surface.

The determined location or pose of the display surface may be specified as a set of surface parameters 306 that define the display surface. For example, the surface parameters 306 may comprise the 2D or 3D coordinates of the corners of the display surface. Alternatively, the surface parameters 306 may comprise the 2D or 3D coordinates of the center of the display surface, along with the dimensions and orientation of the display surface. The surface parameters 306 may take different forms depending on the known or expected shape of the display surface. Note that the display surface may be non-planar. For example, the display surface may be curved or spherical.

Based upon the action 304 of determining the pose or location of the display surface, an action 308 comprises projecting content onto the display surface at the determined location of the display surface. The content may comprise data, text, multimedia, video, photographs, menus, tools, and so forth. The action 308 may be performed by the projector(s) 124 of FIG. 1, in conjunction with other logical and physical components of the ARFN 106. The location, size, and/or pose of the display surface may be determined based on the surface parameters 306 that were previously determined in the action 304. As noted above, the projector(s) may have rotate, pan, and zoom capabilities that allow the content to be directed to different locations within an environment.

An action 310 comprises producing, capturing, or receiving an observed depth map 312 of at least a portion of the environment that contains the display surface. The observed depth map 312 may be constructed using various techniques, depending on the available sensors of the ARFN 106. For example, structured light analysis may be used to construct a depth map of an area corresponding to the display surface. When using structured light analysis, the projector(s) 124 may be used to project a light pattern onto the scene, and the camera(s) 126, offset laterally from the projector(s) 124, may be used to capture images of the reflected light pattern. Distortions in the reflected light pattern may be analyzed to determine the depths of individual points within the observed scene. In certain embodiments, the depth of an individual point may correspond to its distance from a reference plane, such as the plane of the camera(s) 126.

Other 3D analysis techniques or devices may alternatively be used to produce the observed depth map 312, including various 3D imaging devices using optical techniques, audio/sonic techniques, and so forth. In some embodiments, time-of-flight observations may be used to determine the observed depth map 312. In some embodiments, the one or more images captured in the action 302 may be analyzed to produce the observed depth map 312.

The observed depth map 312, as well as other depth maps described herein, may comprise a three-dimensional image or point cloud, in which surface points of objects are specified in terms of their three-dimensional coordinates. For example, each point may be associated with X, Y, and Z coordinates. In FIG. 3, the observed depth map 312 is represented as a two-dimensional array of dots or circles, each of which is associated with a depth (not shown) as its third dimension. Thus, each point may be thought of as having X and Y coordinates corresponding to its position within the two-dimensional array, as well as a Z or depth coordinate that is not represented in FIG. 3. Note that each point of the depth map 312 corresponds to a point on an observed surface.

Solid dots in FIG. 3 represent points of the display surface that have not been occluded, and that have therefore been directly observed when forming the observed depth map 312. Empty circles represent points over the display surface have been occluded, such as by the hand of the user. This distinction between occluded and non-occluded points is shown in FIG. 3 solely for purposes of explanation. The observed depth map itself does not indicate any distinction between points of the display surface and points of an occluding foreground object. Rather, each point of the observed depth map 312 is represented simply by its spatial coordinates, including depth, relative to an observation point.

An action 314 comprises computing or calculating a surface or target depth map 316 of the target display surface or medium, based on the location, position, orientation, and/or 3D pose of the display surface as specified by the surface parameters 306, in light of the known shape of the display surface. In certain embodiments, the shape of the display surface may be represented or defined by one or more parameterized expressions or equations. The calculated surface depth map 316 corresponds in size, position, and orientation to the actual display surface that has been detected within the observed scene, and includes depths of points that have been obscured by the user's hand in the observed scene. Specifically, the surface depth map 316 indicates the calculated depths of an array of points across the display surface, at any desired density of points, and includes depths for points that have not been directly observed. The surface depth map 316 may be calculated at a point density equal to the point density of the observed depth map 312, so that each point of the calculated surface depth map 316 corresponds to a respective point of the observed depth map 312.

An action 318 comprises producing a foreground depth map 320 of an area of the scene corresponding to the display surface, indicating differences in depth between the points indicated by the observed depth map 312 and the respective points indicated by the calculated surface depth map 316. A particular point of the foreground depth map 320 is calculated by taking the difference of the corresponding point of the observed depth map 312 and the corresponding point of the calculated surface depth map 316. More specifically, an individual point of the foreground depth map 320 may be calculated by subtracting the depth of the corresponding point of the calculated surface depth map 316 from the depth of the corresponding point of the observed depth map 312.

As a result of the action 318, points corresponding to the hand of a user overlaying the display surface are represented in the foreground depth map 320 as positive or non-zero depth values, corresponding to distances from the display surface. Points having values of zero or nearly zero correspond to points of the display surface itself. The representation in FIG. 3 of the foreground depth map 320 indicates those points having non-zero values, which correspond to the hand of the user.

The described techniques allow points corresponding to a foreground object such as a hand to be identified or isolated, in a process that also yields a depth map of the foreground object. The foreground depth map 320 may be analyzed to determine properties of the hand. For example, the foreground depth map 320 may be analyzed to determine whether there is a foreground object in the scene corresponding to a human hand. More detailed analysis may be performed to determine the specific shape, configuration, or gesture of the hand. Furthermore, the actions of FIG. 3 may be performed repetitively to identify or record hand actions, motions, gestures, and so forth.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   an image sensor;
   a projector;
   one or more non-transitory computer-readable media storing computer-executable instructions that, when executed by the one or more processors, cause the one or more processors to perform acts comprising:
   capturing one or more images of an environment using the image sensor;
   determining a location of a display medium within the environment based at least in part on the one or more images, wherein the display medium has a known parametric description;
   projecting content onto the display medium using the projector;
   determining an observed depth map of at least a portion of the environment that contains the display medium, wherein the observed depth map includes first depth information associated with the display medium and an object within the environment that at least partially occludes the display medium;
   computing a display depth map of the display medium based at least in part on the location and the known parametric description of the display medium, wherein the display depth map includes second depth information associated with the display medium, the second depth information including a first depth for a first point of the display medium that is unobscured in the one or more images and a second depth for a second point of the display medium that is obscured by the object and that is not depicted in the one or more images; and
   producing a foreground depth map based at least in part on differences between the second depth information of the display depth map and the first depth information of the observed depth map, the foreground depth map indicating a difference in depth between a third point associated with the observed depth map and a corresponding third point associated with the display depth map.

2. The system of claim 1, wherein the display medium is a handheld medium.

3. The system of claim 1, wherein the parametric description of the display medium defines a shape of a surface of the display medium.

4. The system of claim 1, wherein determining the observed depth map comprises time-of-flight observations.

5. The system of claim 1, wherein the display medium is partially occluded by a hand of a user.

6. The system of claim 1, wherein the foreground depth map corresponds to a hand of a user that partially occludes the display medium.

7. The system of claim 1, wherein:
   the observed depth map comprises depths of observed surface points of the at least the portion of the environment;
   the display depth map comprises calculated depths of surface points of the display medium; and
   producing the foreground depth map comprises subtracting respective depths of the display depth map from corresponding depths of the observed depth map.

8. A method, comprising:
   capturing one or more images of an environment that contain a first representation of a target object;
   determining an observed depth map of at least a portion of the environment, wherein the observed depth map includes first depth information associated with the target object;
   computing a target depth map based on a known location of the target object and a known parametric description associated with the target object, wherein the target depth map includes second depth information associated with the target object, the second depth information including a first depth for a first point of the target object that is unobscured in the one or more images and a second depth for a second point of the target object that is obscured by a foreground object in the one or more images; and determining a foreground depth map based at least in part on differences between the second depth information of the target depth map and the first depth information of the observed depth map, the foreground depth map indicating a difference in depth between a third point associated with the observed depth map and a corresponding third point associated with the target depth map.

9. The method of claim 8, wherein the foreground depth map includes third depth information associated with the foreground object.

10. The method of claim 8, wherein determining the observed depth map comprises time-of-flight observations.

11. The method of claim 8, wherein the target object is moveable within the environment.

12. The method of claim 8, further comprising:
determining the known location of the target object based at least in part on the one or more images.

13. The method of claim 8, further comprising determining the known location of the target object based at least in part on the observed depth map.

14. The method of claim 8, further comprising projecting content onto the target object.

15. The method of claim 8, wherein the parametric description associated with the target object defines a shape of a surface of the target object.

16. The method of claim 8, wherein the target object is partially occluded by a hand of a user.

17. The method of claim 8, wherein the foreground depth map corresponds to a hand of a user that partially occludes the target object.

18. The method of claim 8, wherein:
the observed depth map comprises depths of observed surface points of the environment;
the target depth map comprises calculated depths of surface points of the target object; and
producing the foreground depth map comprises subtracting respective depths of the target depth map from corresponding depths of the observed depth map.

19. One or more non-transitory computer-readable media storing computer-executable instructions that, when executed by one or more processors, cause the one or more processors to perform acts comprising:
determining, from one or more images of an environment, a location of a target object within the environment, wherein the target object is partially occluded by a hand of a user;

determining an observed depth map of at least a portion of the environment that contains the target object, wherein the observed depth map includes first depth information associated with the at least the portion of the environment;

computing a target depth map of the target object based on the location and a known parametric description of the target object, wherein the target depth map includes second depth information associated with the target object, the second depth information including a first depth for a first point of the target object that is unobscured in the one or more images and a second depth for a second point of the target object that is obscured by the hand of the user in the one or more images; and producing a foreground depth map corresponding to the hand of the user based at least in part on differences between the second depth information associated with the target depth map and the first depth information associated with the observed depth map, the foreground depth map indicating a difference in depth between a third point associated with the observed depth map and a corresponding third point associated with the target depth map.

20. The one or more non-transitory computer-readable media of claim 19, wherein the known parametric description defines a shape of a surface of the target object.

21. The one or more non-transitory computer-readable media of claim 19, wherein determining the observed depth map comprises time-of-flight observations.

22. The one or more non-transitory computer-readable media of claim 19, wherein the target object comprises a handheld display.

23. The one or more non-transitory computer-readable media of claim 19, the acts further comprising projecting content onto the target object at the location.

24. The one or more non-transitory computer-readable media of claim 19, wherein determining the location of the target object is based at least on part on the observed depth map.

25. The one or more non-transitory computer-readable media of claim 19, wherein:
the observed depth map comprises depths of observed surface points of the at least the portion of the environment;
the target depth map comprises calculated depths of surface points of the target object; and
producing the foreground depth map comprises subtracting respective depths of the target depth map from corresponding depths of the observed depth map.

\* \* \* \* \*